(12) United States Patent
Forsyth

(10) Patent No.: US 7,518,095 B2
(45) Date of Patent: Apr. 14, 2009

(54) METHOD AND APPARATUS FOR PROVIDING NON-LINEAR, PASSIVE QUENCHING OF AVALANCHE CURRENTS IN GEIGER-MODE AVALANCHE PHOTODIODES

(75) Inventor: Keith W. Forsyth, Philadelphia, PA (US)

(73) Assignee: Sensors Unlimited, Inc., Princeton, NJ (US)

( * ) Notice: Subject to any disclaimer, the term of this patent is extended or adjusted under 35 U.S.C. 154(b) by 0 days.

(21) Appl. No.: 12/048,514

(22) Filed: Mar. 14, 2008

(65) Prior Publication Data

US 2008/0217521 A1  Sep. 11, 2008

Related U.S. Application Data

(62) Division of application No. 11/106,058, filed on Apr. 14, 2005, now Pat. No. 7,361,882.

(51) Int. Cl.
*H03F 3/08* (2006.01)
(52) U.S. Cl. .................................. 250/214 R; 327/326
(58) Field of Classification Search ............ 250/214 R; 327/309, 326
See application file for complete search history.

(56) References Cited

U.S. PATENT DOCUMENTS

| | | | |
|---|---|---|---|
| 4,623,786 | A | 11/1986 | Rodwell |
| 5,933,042 | A | 8/1999 | Trottier et al. |
| 6,307,196 | B1 | 10/2001 | Thompson et al. |
| 6,525,305 | B2 | 2/2003 | Deschamps et al. |
| 6,541,752 | B2 | 4/2003 | Zappa et al. |
| 7,042,295 | B2 | 5/2006 | Guckenberger et al. |
| 7,361,882 | B2 | 4/2008 | Forsyth |

OTHER PUBLICATIONS

Office Action dated Aug. 21, 2006, from parent U.S. Appl. No. 11/106,058, filed Apr. 14, 2005, now U.S. Patent No. 7,361,882 (5 pages).
Office Action dated Dec. 29, 2006, from parent U.S. Appl. No. 11/106,058, filed Apr. 14, 2005, now U.S. Patent No. 7,361,882 (7 pages).
Office Action dated Jun. 20, 2007, from parent U.S. Appl. No. 11/106,058, filed Apr. 14, 2005, now U.S. Patent No. 7,361,882 (7 pages).
Notice of Allowance dated Dec. 20, 2007, from parent U.S. Appl. No. 11/106,058, filed Apr. 14, 2005, now U.S. Patent No. 7,361,882 (7 pages).
Cova, et al., "Avalanche Photodiodes and Quenching Circuits for Single Photon Detection," Applied Optics, vol. 35, No. 12, pp. 1956-1976, Apr. 1996 (21 pages).
Zappa, et al., "Monolithic Active-Quenching and Active-Reset Circuit for Single-Photon Avalanche Detectors," IEEE Journal of Solid-State Circuits, vol. 38, No. 7, pp. 1298-1301, Jul. 2003 (4 pages).

*Primary Examiner*—Stephen Yam
(74) *Attorney, Agent, or Firm*—McCarter & English, LLP

(57) ABSTRACT

A method and apparatus for providing non-linear, passive quenching of avalanche currents in Geiger-mode avalanche photodiodes (APDs) is provided. A non-linear, passive, current-limiting device is connected in series with the APD and a bias source. The non-linear, passive, current-limiting device rapidly quenches avalanche currents generated by the APD in response to an input photon and resets the APD for detecting additional photons, using a minimal number of components. The non-linear, passive, current-limiting device could comprise a field-effect transistor (FET), as well as a junction FET (JFET) a metal-oxide semiconductor FET (MOSFET), or a current-limiting diode (CLD) connected in series with the APD and the bias source.

16 Claims, 3 Drawing Sheets

METHOD AND APPARATUS FOR PROVIDING NON-LINEAR, PASSIVE QUENCHING OF AVALANCHE CURRENTS IN GEIGER-MODE AVALANCHE PHOTODIODES

RELATED APPLICATIONS

This is a divisional application of U.S. patent application Ser. No. 11/106,058 filed Apr. 14, 2005, now U.S. Pat. No. 7,361,882, the entire disclosure of which is expressly incorporated herein by reference.

BACKGROUND OF THE INVENTION

1. Field of the Invention

The present invention relates to the quenching of avalanche currents in photodiodes. More particularly, the present invention relates to a method and apparatus for providing non-linear, passive quenching of avalanche currents in Geiger-mode avalanche photodiodes.

2. Related Art

In many applications in the optoelectronic arts, it is often beneficial to detect individual photons with an optoelectronic device. Single-photon detection can be accomplished using devices such as photomultiplier tubes and avalanche photodiodes (APDs). Photon counting with APDs is typically accomplished by operating the APD in the so-called "Geiger" mode, wherein the APD is biased above its zero-frequency breakdown voltage to produce an average internal gain on the order of one million or higher. Under such conditions, a readily-detectable avalanche current can be produced in response to a single input photon, thereby allowing the APD to be utilized to detect individual photons.

When a current avalanche is triggered in a Geiger-mode APD in response to a single input photon, the avalanche current continues as long as the bias voltage remains above the breakdown voltage of the APD. Thus, in order to detect the next photon, the avalanche current must be "quenched" and the APD reset. Quenching the avalanche current and resetting the APD involves a two-step process, wherein the APD bias is reduced below the APD breakdown voltage to quench the avalanche current as rapidly as possible, and the APD bias is then raised to a voltage above the APD breakdown voltage so that the next photon can be detected. During this process, the APD is incapable of detecting photons, thereby resulting in a "dead" time period. Therefore, it is beneficial to quench the avalanche current and reset the APD as quickly as possible to reduce dead time. Additionally, to minimize increases in the dark count rate ("after-pulsing") that can occur with high photon arrival rates, it is also beneficial to limit the avalanche current to a minimum.

Various passive and active circuits have in the past been developed for quenching avalanche currents generated by Geiger-mode APDs. For example, the most basic passive quenching circuit is a resistor connected in series with a high-voltage bias applied to an APD. While such a circuit has the advantage of simplicity, this circuit typically results in detector dead times of many tens of microseconds. Due to the long resistor-capacitor (RC) time constant of this circuit, the bias across the APD varies continuously during the reset time, which results in undesirable variations in the photon detection probability of the APD. Various active quenching circuits overcome these limitations by employing a fast transistor circuit with numerous transistors to switch the bias voltage of the APD rapidly between voltages above and below the APD breakdown voltage. However, such circuits are often complex, require numerous components in addition to the transistors, and cannot easily be integrated into large photon-counting arrays.

Accordingly, what would be desirable, but has not yet been provided, is a simple and effective method and apparatus for quenching of avalanche currents in Geiger-mode APDs, wherein avalanche currents are rapidly quenched, detector dead time is minimized, and accurate photon detection is provided using a small number of components.

SUMMARY OF THE INVENTION

The present invention relates to method and apparatus for providing non-linear, passive quenching of avalanche currents in Geiger-mode avalanche photodiodes. The apparatus comprises a Geiger-mode avalanche photodiode (APD); a bias source; and a non-linear, passive, current-limiting device connected in series with the bias source and the APD for quenching avalanche currents generated by the APD. The non-linear, passive, current-limiting device could comprise a field-effect transistor (FET), a junction FET (JFET), a metal-oxide semiconductor FET (MOSFET), or a current-limiting diode (CLD) connected in series with the APD and the bias source. The non-linear, passive, current-limiting device rapidly quenches avalanche currents generated by the APD in response to an input photon and resets the APD for detecting additional photons, using a minimal number of components.

The method of the present invention for quenching avalanche currents in a Geiger-mode APD comprises the steps of connecting a non-linear, passive, current-limiting device in series with an APD and a bias source; after an avalanche current is triggered by an input photon received by the APD, reducing a bias voltage of the APD with the non-linear, passive, current-limiting device to a voltage below a breakdown voltage of the APD to quench the avalanche current; and after quenching the avalanche current, increasing the bias voltage of the APD with the non-linear, passive, current-limiting device to the breakdown voltage of the APD. The method could be practiced using a FET, JFET, MOSFET, or CLD connected in series with the APD and the bias source.

BRIEF DESCRIPTION OF THE DRAWINGS

These and other important objects and features of the invention will be apparent from the following Detailed Description of the Invention, taken in connection with the accompanying drawings, in which.

DETAILED DESCRIPTION OF THE INVENTION

The present invention relates to a method and apparatus for providing non-linear, passive quenching of avalanche currents in Geiger-mode avalanche photodiodes (APDs). In one embodiment, the present invention comprises a Junction field-effect transistor (JFET) connected in series with an APD, wherein the drain terminal of the JFET is connected to the APD or bias source and the gate and source terminals are connected together. In another embodiment, the present invention comprises a metal-oxide semiconductor field-effect transistor (MOSFET) connected in series with an APD, wherein the drain terminal of the MOSFET is connected to the APD or bias source and the gate and source terminals are connected together. In another embodiment, the present invention comprises a current-limiting diode (CLD) connected in series with an APD. In response to an avalanche current generated by an input photon received by the APD, the series impedance of the JFET, MOSFET, or CLD increases rapidly, thereby reducing the bias voltage across the APD to a level below the breakdown voltage of the APD to quench the avalanche current. In response to the sharp current decrease resulting from the drop in voltage across the APD, the series impedance of the JFET, MOSFET, or CLD then decreases to its original value, thereby returning the bias voltage across the APD to its original value above the breakdown voltage and resetting the APD so that additional input photons can be detected. In this manner, the present invention minimizes detector dead time and provides efficient photon detection using a small number of components.

Figure 1:
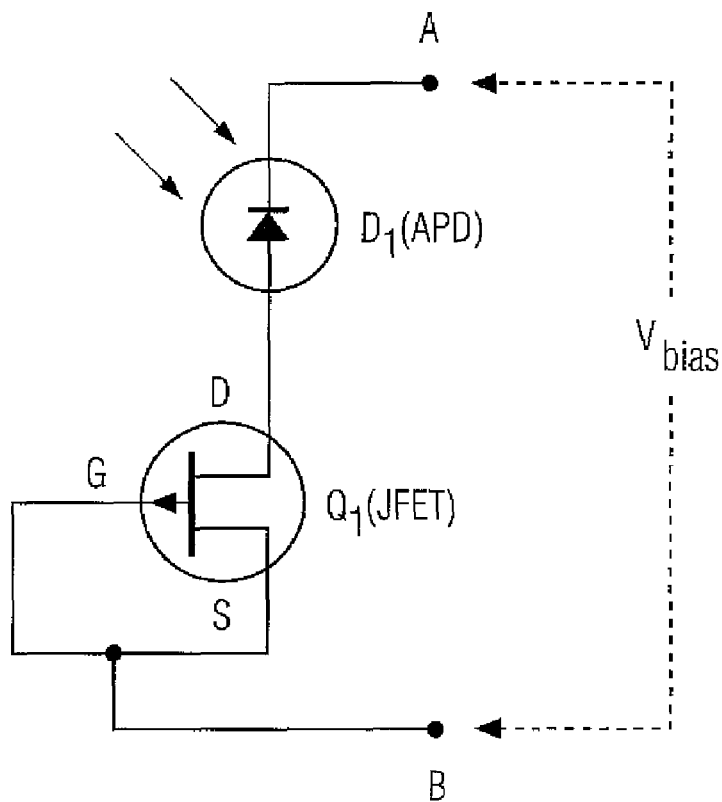
FIG. 1 is a simplified schematic diagram showing an embodiment of the quenching apparatus of the present invention, wherein quenching is achieved using a junction field-effect transistor (JFET).

FIG. 1 is a schematic diagram showing an embodiment of the quenching apparatus of the present invention, wherein quenching is achieved using a junction field-effect transistor (JFET). The circuit shown in FIG. 1 includes an avalanche photodiode (APD) $D_1$ which could comprise any APD suitable for Geiger-mode operation. A JFET $Q_1$ is connected in series with the APD $D_1$ and a bias voltage source. The JFET $Q_1$ could be connected to either the anode or the cathode of the APD $D_1$, so long as the indicated polarity of both components is maintained and the JFET and APD are in series with the bias source. The JFET $Q_1$ could comprise any suitable, commercially-available, depletion-mode JFET. The gate terminal G and drain terminal S of JFET $Q_1$ are connected together to form a two-terminal device. A bias voltage $V_{bias}$ is applied across APD $D_1$ and JFET $Q_1$ (illustratively, at connection points A and B).

During operation of the circuit shown in FIG. 1, JFET $Q_1$ operates as a constant-current source, limiting the current supplied to the APD $D_1$ to the saturated drain-source current ($I_{dss}$) of the JFET $Q_1$. If JFET $Q_1$ is fabricated such that $I_{dss}$ is approximately equal to the APD dark current obtained when $V_{bias}$ is equal to the breakdown voltage of the APD $D_1$, then $Q_1$ will successfully quench avalanche currents generated by the APD $D_1$ operated in Geiger mode in response to an input photon. During application of a constant or gated bias voltage $V_{bias}$ exceeding the breakdown voltage of the APD and prior to the triggering of an avalanche current, the impedance of the JFET will be low (e.g., on the order of 10 kΩ or less), because the current magnitude will be less than $I_{dss}$. When an avalanche current is produced in response to an input photon or a thermally-generated free carrier, the JFET impedance will rise rapidly and prevent the current from exceeding $I_{dss}$, thereby quenching the avalanche current. Thereafter, the circuit impedance will drop rapidly, thereby successfully "resetting" the APD $D_1$ to allow it to detect the next photon. The response time from the initiation to quenching of the avalanche current is limited by the internal resistance-capacitance (RC) time constant of the JFET $Q_1$, and could be as low as 1 nanosecond, or even less. Accordingly, the circuit shown in FIG. 1 combines the simplicity and low component count of passive quenching devices with the fast response, short dead time, and APD bias stability of active quenching devices. Importantly, the present invention requires significantly fewer components than conventional active quenching circuits, thereby providing a significant manufacturing advantage and allowing the present invention to be easily fabricated in one- or two-dimensional monolithic or hybrid arrays of photon-counting, Geiger-mode APDs.

Figure 2:
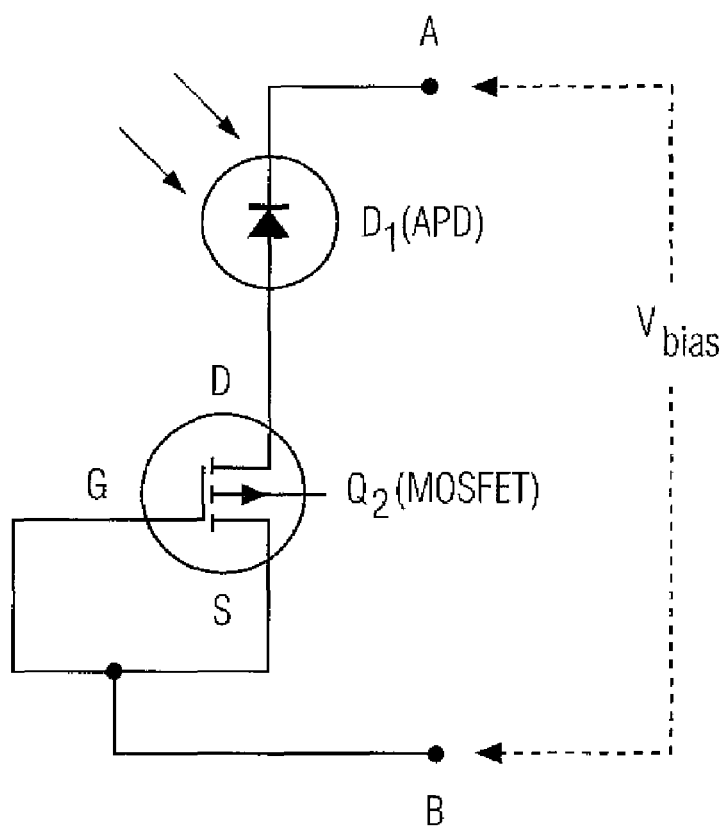
FIG. 2 is a simplified schematic diagram showing an alternate embodiment of the quenching apparatus of the present invention, wherein quenching is achieved using a metal-oxide semiconductor field-effect transistor (MOSFET).

FIG. 2 is a schematic diagram showing an alternate embodiment of the quenching apparatus of the present invention, wherein quenching is achieved using a metal-oxide semiconductor field-effect transistor (MOSFET). The circuit shown in FIG. 2 is substantially similar to the circuit shown in FIG. 1, except that the JFET $Q_1$ of FIG. 1 is substituted with MOSFET $Q_2$. Similar to the JFET $Q_1$ of FIG. 1, the drain terminal D of MOSFET $Q_2$ is connected in series with APD $D_1$ and the gate and source terminals G and S of MOSFET $Q_2$ are connected together to form a two-terminal device. MOSFET $Q_2$ could comprise any suitable, commercially available MOSFET operated in depletion mode. During operation, MOSFET $Q_2$ operates as a constant-current source, limiting the current supplied to the APD $D_1$ to the $I_{dss}$ of MOSFET $Q_2$.

Figure 3:
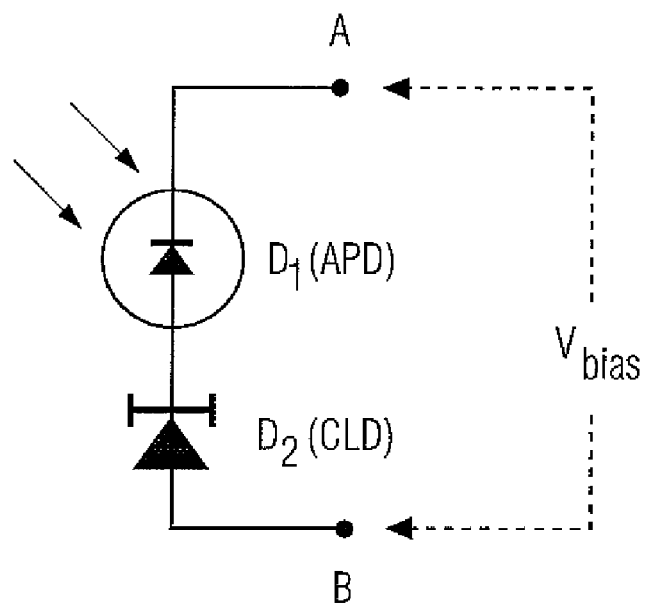
FIG. 3 is a simplified schematic diagram showing an alternate embodiment of the quenching apparatus of the present invention, wherein quenching is achieved using a current-limiting diode (CLD).

FIG. 3 is a schematic diagram showing an alternate embodiment of the quenching apparatus of the present invention, wherein quenching is achieved using a current-limiting diode (CLD). The JFET and MOSFET embodiments of the present invention, discussed earlier with respect to FIGS. 1 and 2, are optimal for integrated applications (e.g., providing current avalanche quenching in Geiger-mode APD arrays). However, for non-integrated applications (e.g., providing current avalanche quenching for single APD sensors) where $I_{dss}$ values as low as 10 µA are required, a CLD can perform the same function as a JFET or MOSFET. CLDs are two-terminal devices that are functionally equivalent to depletion-mode JFETs and MOSFETs with their gate and source terminals connected, but have design and fabrication parameters optimized for current-regulating functions. As shown in FIG. 3, CLD $D_2$ replaces the JFET and MOSFET transistors of FIGS. 1 and 2, and is connected in series with APD $D_1$. CLD $D_2$ could be any suitable, commercially-available CLD having a typical current limit of 35 µA or lower, with precise control of the current-limiting value and voltage compliance (breakdown voltage) of 100 volts or more. A typical commercially-available CLD rated at approximately 35 µA has a DC impedance of approximately 3 kΩ at a current of one µA, and a DC impedance of 500 kΩ at a current of 50 µA. The inherent response time of a discrete CLD with such ratings is on the order of a few nanoseconds, which is sufficiently fast for APD pulse quenching.

It should be noted that the present invention could be implemented using enhancement-mode transistors as well as depletion-mode transistors. Such an implementation would require additional components for saturating the transistors. Further, the present invention can be implemented using commercially-available IC fabrication processes. Additionally, the present invention can be used as a non-gated Geiger-mode photon counter, wherein the APD is cooled to a sufficiently low temperature so that the mean dark pulse generation rate of the APD is lower than the expected mean photon arrival rate. In such a configuration, $V_{bias}$ is set to a DC value of approximately 1-10% above the breakdown voltage of the APD with no pulsed ("gate") bias. With each avalanche current generated by the APD, the present invention quenches the avalanche and resets the APD within approximately a few nanoseconds to a few tens of nanoseconds. Therefore, the present invention can be operated without any triggered gate function, in approximately the same manner as a photomultiplier tube.

Figure 4:
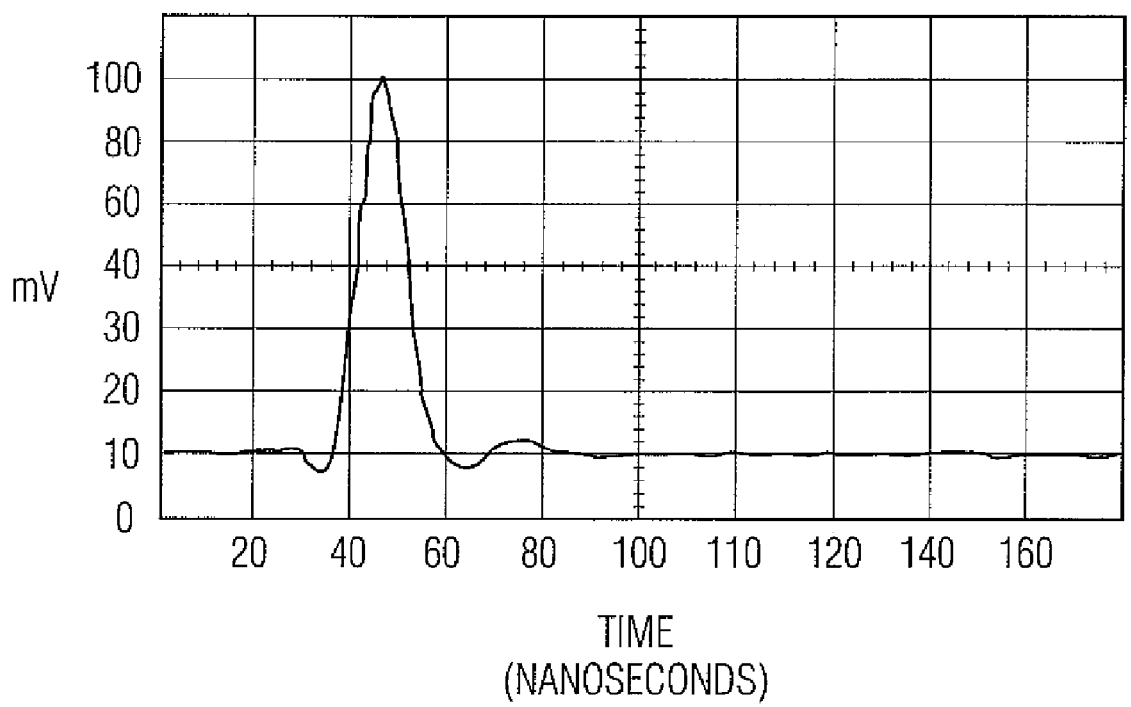
FIG. 4 is a graph showing quenching of a single Geiger-mode avalanche current pulse achieved by the present invention.

FIG. 4 is a graph showing quenching of an avalanche current achieved by the present invention. The graph is a single-shot oscilloscope trace of APD current generated in response to a single input photon, wherein the magnitude axis represents the voltage across a 50 ohm load resistor produced by an APD avalanche current. The spike in the graph corresponds to the avalanche current generated in response to the photon. Initially, the APD is biased to a voltage of about 10 mV. At around 40 nanoseconds, an avalanche current is generated and rises rapidly to approximately 100 mV in response to the input photon. Thereafter, the present invention rapidly quenches the current and resets the APD to its initial bias voltage. The APD dead time is approximately 40 nanoseconds.

Figure 5:
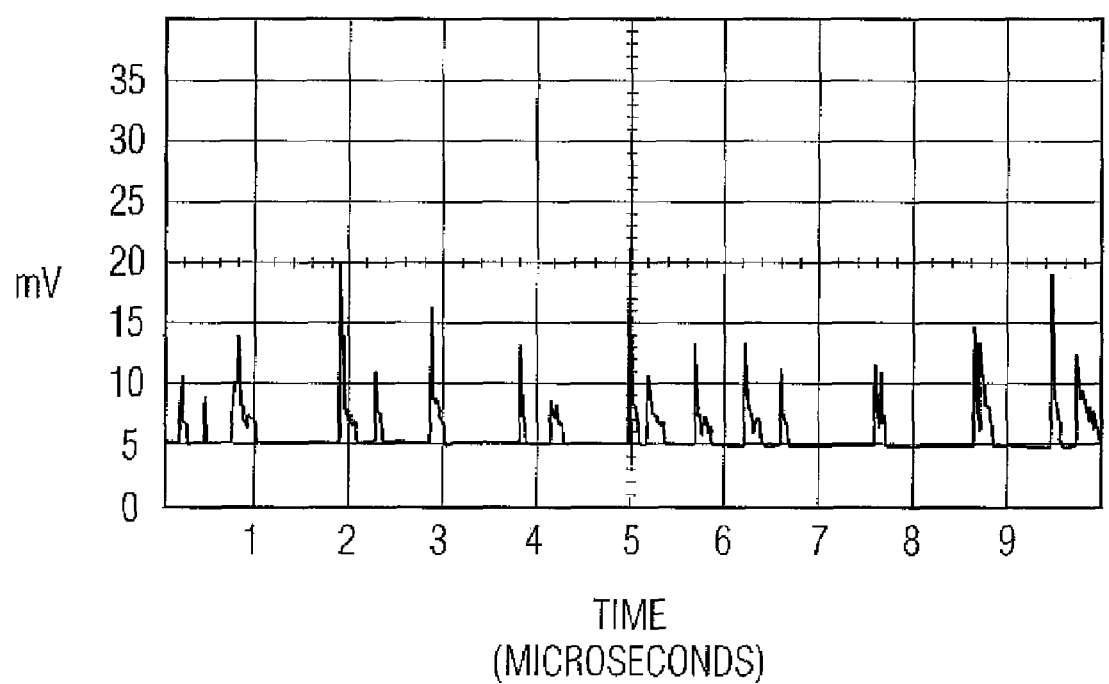
FIG. 5 is a graph showing quenching achieved by the present invention of APD output currents in a non-gated mode.

FIG. 5 is a graph showing quenching achieved by the present invention of APD output currents in a non-gated mode. The present invention can be operated as a non-gated photon counter, whereby no trigger gate function is required to initiate photon detection. In such an arrangement, the present invention automatically quenches and resets the APD within a few nanoseconds to tens of nanoseconds, allowing for the rapid detection of photons. The graph shows an oscilloscope trace of APD current in response to photons detected in non-gated mode, wherein the magnitude axis represents the voltage across a 50 ohm load resistor produced by an APD avalanche current. The spikes shown in the graph correspond to avalanche currents generated in response to photons received by the APD, as well as background noise due to random, thermally-generated carriers in the APD absorption layer. As can be seen in the graph, each avalanche current is rapidly quenched by the invention.

Having thus described the invention in detail, it is to be understood that the foregoing description is not intended to limit the spirit and scope thereof. What is desired to be protected by Letters Patent is set forth in the appended claims.

What is claimed is:

1. A method for quenching avalanche currents in a Geiger-mode avalanche photodiode (APD), comprising:
    connecting a non-linear, passive, current-limiting device in series with an APD and a bias source;
    after an avalanche current is triggered by an input photon received by the APD, reducing a bias voltage across the APD using the non-linear, passive, current-limiting device to a voltage below a breakdown voltage of the APD to quench the avalanche current; and
    after quenching the avalanche current, increasing the bias voltage of the APD using the non-linear, passive, current-limiting device to the breakdown voltage of the APD.

2. The method of claim 1, wherein the step of connecting the non-linear, passive, current limiting device comprises connecting a field-effect transistor (FET) in series with the APD and the bias source.

3. The method of claim 2, further comprising connecting source and drain terminals of the FET together and to the bias source.

4. The method of claim 2, wherein the step of connecting the FET in series with the APD comprises connecting a junction FET (JFET) in series with the APD.

5. The method of claim 4, wherein the step of connecting the JFET in series with the APD comprises connecting a depletion-mode JFET in series with the APD.

6. The method of claim 2, wherein the step of connecting the FET in series with the APD comprises connecting a metal-oxide semiconductor field-effect transistor (MOSFET) in series with the APD.

7. The method of claim 1, wherein the step of connecting the non-linear, passive, current-limiting device comprises connecting a current-limiting diode in series with the APD and the bias source.

8. The method of claim 1, further comprising operating the non-linear, passive, current-limiting device and the APD in a non-gated mode.

9. A method for quenching avalanche currents in a Geiger-mode avalanche photodiode (APD), comprising:
    connecting a non-linear, passive, current-limiting device in series with an APD and a bias source;
    receiving an input photon using the APD, the input photon triggering an avalanche current in the APD;
    quenching the avalanche current using the non-linear, passive, current-limiting device; and
    resetting the APD using the non-linear, passive, current-limiting device to detect another photon using the APD.

10. The method of claim 9, wherein the step of connecting the non-linear, passive, current-limiting device comprises connecting a field-effect transistor (FET) in series with the APD and the bias source.

11. The method of claim 10, further comprising connecting source and chain terminals of the FET together and to the bias source.

12. The method of claim 10, wherein the step of connecting the FET in series with the APD comprises connecting a junction FET (JFET) in series with the APD.

13. The method of claim 12, wherein the step of connecting the JFET in series with the APD comprises connecting a depletion-mode JFET in series with the APD.

14. The method of claim 10, wherein the step of connecting the FET in series with the APD comprises connecting a metal-oxide semiconductor field-effect transistor (MOSFET) in series with the APD.

15. The method of claim 9, wherein the step of connecting the non-linear, passive, current-limiting device comprises connecting a current-limiting diode in series with the APD and the bias source.

16. The method of claim 9, further comprising operating the non-linear, passive, current-limiting device and the APD in a non-gated mode.

* * * * *